United States Patent [19]

Johannson et al.

[11] Patent Number: 4,854,573
[45] Date of Patent: Aug. 8, 1989

[54] EXERCISING DEVICE

[75] Inventors: Gerald G. Johannson, Abbotsford; Gordon R. Trca, Coquitlam, both of Canada

[73] Assignee: International Power Blocks Holdings Ltd., Coquitlam, Canada

[21] Appl. No.: 151,933

[22] Filed: Feb. 3, 1988

[51] Int. Cl.$^4$ .............................................. A63B 1/00
[52] U.S. Cl. ..................................... 272/93; 272/62; 272/63; 272/111
[58] Field of Search ....................... 272/61, 62, 93, 67, 272/68, DIG. 4, 111, 113, 120, 126

[56] References Cited

U.S. PATENT DOCUMENTS

| | | | |
|---|---|---|---|
| 715,530 | 12/1902 | Wallace | 272/62 |
| 4,155,547 | 5/1979 | Savio et al. | 272/67 |
| 4,232,863 | 11/1980 | Roach | 272/93 |
| 4,539,977 | 9/1985 | Schneider Sr. | 272/111 |

OTHER PUBLICATIONS

Avita Dip Stand; M. & R. Industries, 1984 Copy Located in Cl. 272/73, Grp. 330.

Primary Examiner—S. R. Crow
Attorney, Agent, or Firm—Bull, Housser & Tupper

[57] ABSTRACT

An exercising apparatus for performing push-ups, etc. on a surface such as a floor, the apparatus having a handle and first and second supports. The first and second supports both have first and second sides for placement of the supports on the surface. The handle can be supported at a first distance from the first side and at a second different distance from the second side. The first and second supports may be oriented to place the first sides on the surface thereby positioning the handle at the first distance from the floor. Alternatively, the first and second supports may be oriented to place the second sides on the surface thereby positioning the handle at the second distance from the floor.

14 Claims, 3 Drawing Sheets

EXERCISING DEVICE

BACKGROUND OF THE INVENTION

The invention relates to an apparatus for performing exercises, particularly those known as "push-ups".

Several devices on which push-up exercises may be performed have been patented. Such devices are disclosed in U.S. Pat. No. 2,666,640 (Jennings); U.S. Pat. No. 4,327,907 (DeVries); and U.S. Pat. No. 4,610,448 (Hill). Many prior art devices support a handle or handles at a fixed distance from a surface, usually the floor. Such prior art devices do not provide a way of easily adjusting the distance between the handle and the surface and consequently cannot adequately accommodate a person in various stages of conditioning.

SUMMARY OF THE INVENTION

The invention reduces the limitations of the prior art push-up exercising apparatus by providing an apparatus which is easily adjusted to increase or decrease push-up difficulty. The invention allows the user to place the apparatus in one of a plurality of orientations, for example three orientations, thereby positioning a handle, on which the push-ups are to be performed, at one of three different distances from the surface such as a floor. Two similar apparatuses are used, the user holding onto one in each hand and pushing on the apparatuses to raise himself from the floor.

A person just starting to condition himself would begin training by orienting the two apparatuses so that the handles with the shortest distance to the floor are rendered operative. As the person progresses in conditioning, the two apparatuses would be re-oriented to render operative the handles with the next shortest distance to the floor. As the person further progresses, the two apparatuses would be re-oriented to render operative the handles with the furthest distance to the floor, thus providing maximum exercising difficulty.

By combining the orientation of the apparatuses with the way in which the user may choose to place the apparatuses on the floor, push-up exercises may be used to strengthen several areas of the body such as triceps, front and rear deltoids, biceps, pectoral muscles and the like. In addition, the apparatuses may be used for performing quick dip exercises for further upper body strength and conditioning.

Another embodiment of the apparatus according to the invention is for performing push-up exercises, etc. on a surface such as a floor. The apparatus includes a handle and first and second supports. The first and second supports both have first and second sides for placement of the supports on the surface. The handle is supported at a first distance from the first side and at a second different distance from the second side. The first and second supports may be oriented to place the first sides on the surface thereby positioning the handles thereof at the first distance from the floor. Similarly the first and second supports may be oriented to place the second sides on the surface thereby positioning the handles thereof at the second distance from the floor. The handles have a plurality of longitudinal grooves to prevent slippage of a hand gripped thereon. The handles can be releasably attached to the supports and have locking tabs and depth stops which cooperate with collars on the first and second supports to securely hold the handles and prevent axial movements of the supports. The handles also have a longitudinal groove forming a keyway to engage with the keying member in the collars to prevent rotation.

DESCRIPTION OF THE PREFERRED EMBODIMENTS

Figure 1:
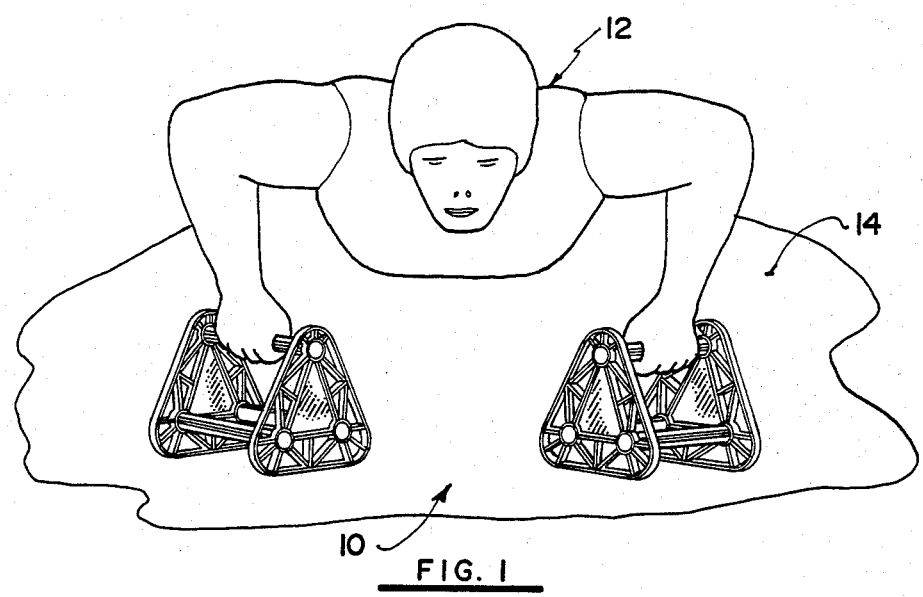
FIG. 1 is a simplified perspective of a pair of the apparatuses in use.

Referring to FIG. 1, a pair of exercising apparatuses is shown generally at 10 in use by a person 12 performing push-up exercises on a surface 14.

Figure 2:
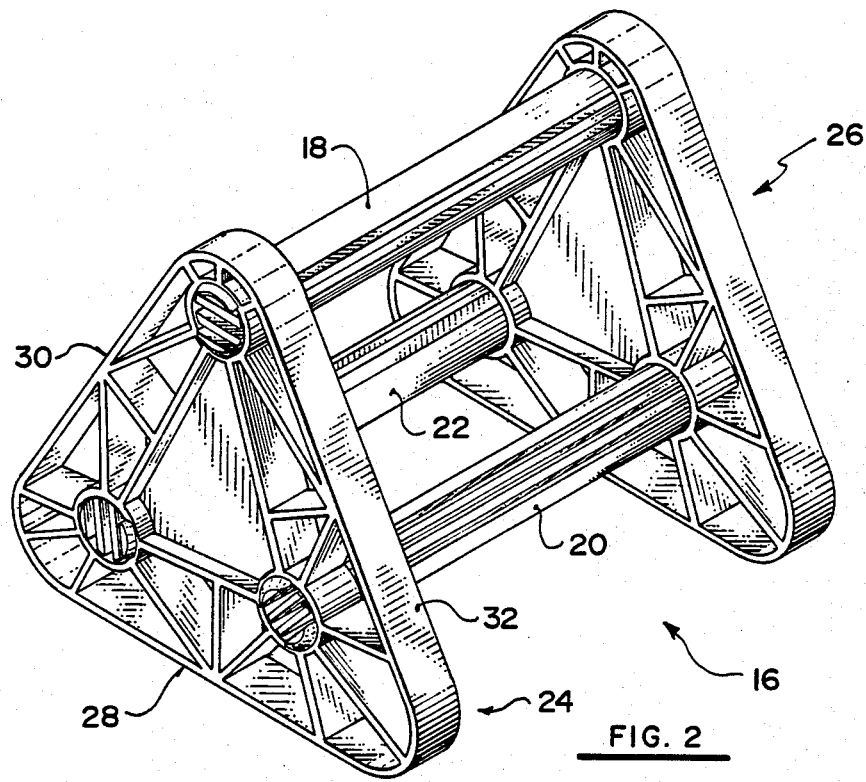
FIG. 2 is a simplified perspective of one apparatus.

Referring to FIG. 2, a single exercising apparatus is shown generally at 16, comprising a first handle 18, a second handle 20 and a third handle 22, all the handles being similar. Each handle is operably connected to, and extends between, a first support 24 and a second support 26. The first and second supports 24 and 26 are similar, and consequently only the first support 24 will be described in detail. The support 24 has an equilateral triangular shape comprising a first side 28, a second side 30 and a third side 32.

Figure 3:
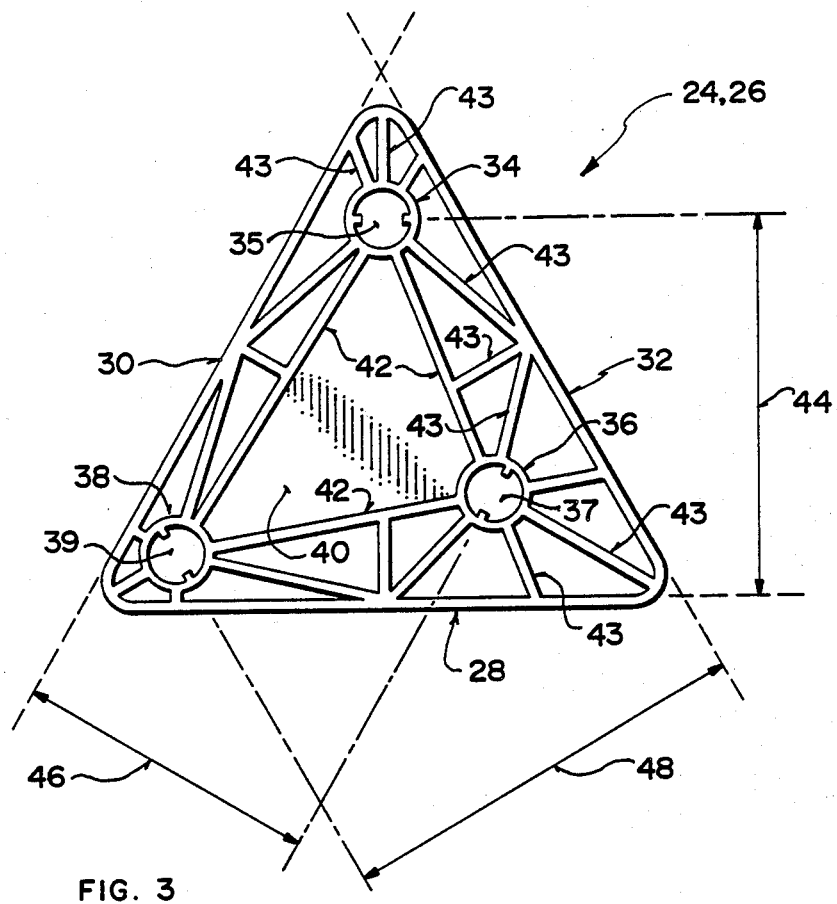
FIG. 3 is a simplified elevation of one support.

Referring to FIG. 3, the first support 24 includes a first collar 34 having an opening 35, the collar providing first holding means for holding the first handle 18. The first support 24 also includes a second collar 36 having an opening 37 and a third collar 38 having an opening 39, the collars 36 and 38 providing second and third holding means respectively.

Each collar 34, 36 and 38 is supported by first, second and third brace means respectively, which include a web member 40 extending between the collars 34, 36 and 38, a plurality of inner stiffening members 42 also extending between the collars and a plurality of outer stiffening members 43 extending from the sides 28, 30 and 32 to the collars 34, 36 and 38 and the inner stiffening members 42. The combination of the collars 34, 36 and 38, the inner stiffening members 42, the outer stiffening members 43 and the web member 40 provide first, second and third means for supporting the first, second and third handles 18, 20 and 22 respectively.

The collars 34, 36 and 38 are supported generally adjacent vertices of the triangular shape and at different perpendicular distances from respective sides 28, 30 and 32 disposed oppositely to the respective vertices. The first collar 34 is supported at a first distance 44 from the first side 28. The second collar 36 is supported at a second different distance 46 from the second side 30, and the third collar 38 is supported at a third different distance 48 from the third side 32.

Figure 4:
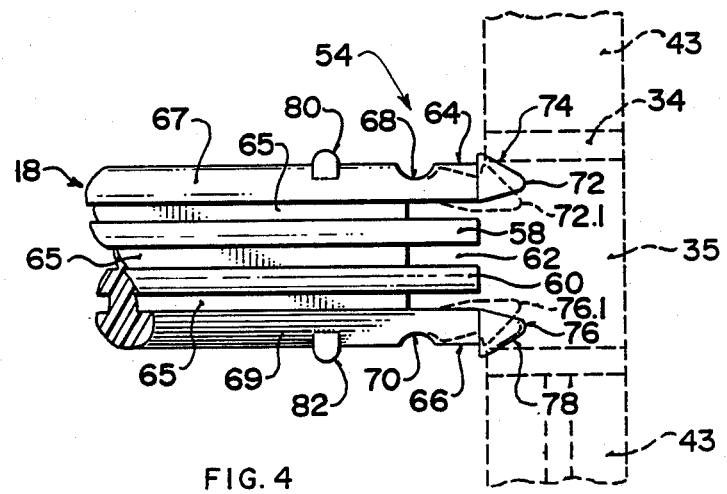
FIG. 4 is a simplified fragmented side view of a first end portion of one handle, shown cooperating with a collar of a support.
Figure 6:
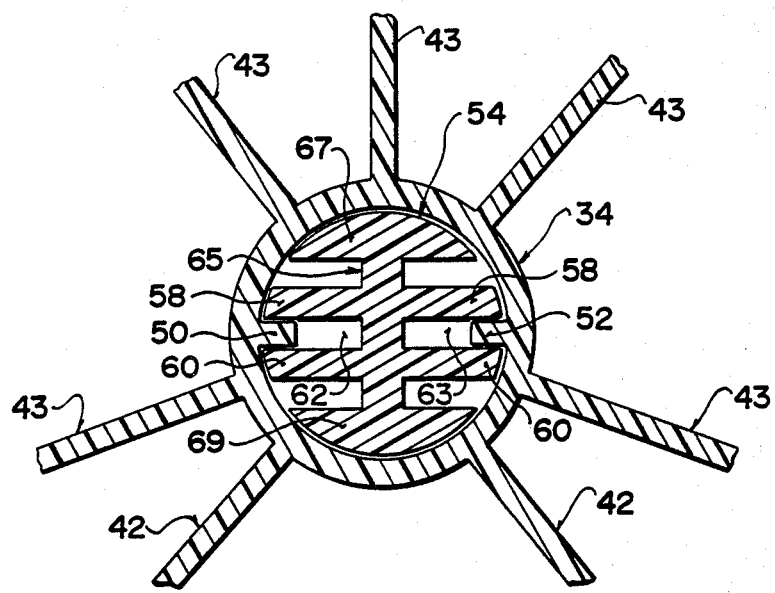
FIG. 6 is a simplified fragmented cross section of a first end portion of one handle inserted into a collar.

Referring to FIGS. 4 and 6, the handle 18 includes a first end portion 54 and a second, similar end portion (not shown) at an opposite end of the handle. The end portion 54 includes spaced apart first and second guide members 58 and 60 which are disposed on each side of the end portion and form keyways 62 and 63 on generally diametrically opposite sides of the end portion, as best seen in FIG. 6. The guide members 58 and 60 extend from a diametrical web member 65 and all three members extend the length of the handle. The end portion 54 also includes first and second locking tabs 64 and 66 attached to longitudinally extending outer segments 67 and 69 of the handle by first and second resiliently bendable portions 68 and 70.

A first cam portion 72 having a first tapered surface 74 extends from the end of the first locking tab 64. A second cam portion 76 having a second tapered surface 78 extends from the end of the second locking tab 66. The first and second tapered surfaces 74 and 78 are adapted for contact with an end face of the collar 34 when the first end portion 54 is pushed against the collar for insertion therein.

As shown in broken outline in FIG. 4, as the first end portion 54 is pushed against the first collar 34, the first and second cam portions 72 and 76 and hence the first and second locking tabs 64 and 66 are deflected inwardly, bending about the first and second resiliently bendable portions 68 and 70 as indicated by broken lines at 72.1 and 76.1.

Figure 5:
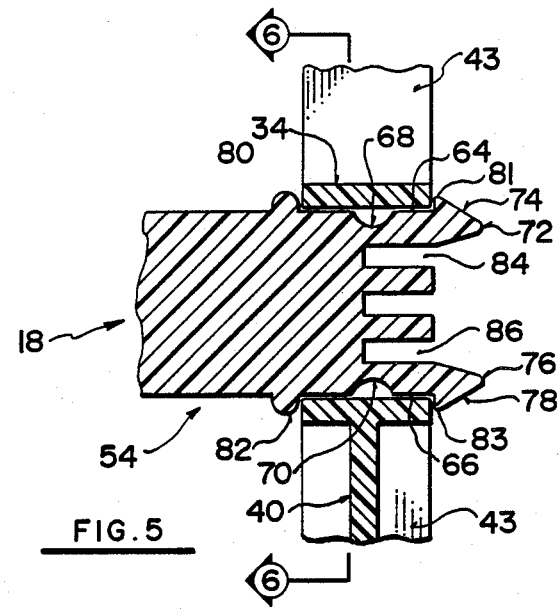
FIG. 5 is a simplified fragmented longitudinal cross section of a first end portion of one handle inserted into a collar of a support.

Referring to FIG. 5, the first end portion 54 is shown after having been pushed through the collar 34 until first and second depth stops 80 and 82 are in contact with the first collar 34. At this point, the first and second cam portions 72 and 76 have passed through the first collar 34. Thus the first collar 34 is no longer in contact with the first and second tapered surfaces 74 and 78, and consequently the first and second cam portions 72 and 76 and the first and second locking tabs 64 and 66 are no longer deflected. The first and second resilient portions 68 and 70 return the first and second locking tabs 64 and 66 to their original position, and the assembly of the first end portion 54 into the first collar 34 of the first support 24 is then complete.

The first support 24 is prevented from axial movement towards the middle of the first handle 18 by the first and second depth stops 80 and 82. Axial movement of the support 24 away from the middle of the first handle 18 is prevented by interference with first and second shoulders 81 and 83 at inner ends of the first and second cam portions 72 and 76.

The handle 18 further includes first and second longitudinal grooves 84 and 86 on each side thereof. The grooves 84 and 86, and similar parallel grooves which are continuations of the keyways 62 and 63 extend lengthwise of the handle and provide means to prevent slippage by a hand gripped thereon.

Referring again to FIG. 6, the collar 34, which is representative of collars 36 and 38, is shown including first and second keying members 50 and 52 located diametrically opposite each other and extending radially inward from the collar. The first and second keying members 50 and 52 ensure correct orientation and prevent rotation of the handle so that the segment 67, without grooves, is uppermost for comfortable gripping.

Rotation of the handle is prevented by the engagement of the first and second keying members 50 and 52 with the keyways 62 and 63 respectively on each side of the first end portion 54.

The first end portions of the second and third handles 20 and 22 are assembled onto the first support 24 in the manner just described. The second end portions of the first, second and third handles 18, 20 and 22 are similar and are also assembled onto the second support in the same manner as described above.

Referring to FIGS. 4 and 5, to disassemble the first handle 18 from the first support 24, the first end portion 54 is removed from the first collar 34 as follows. The first and second cam portions 72 and 76 may be squeezed inwardly, consequently deflecting the first and second locking tabs 64 and 66 inwardly against the force of the first and second resilient portions 68 and 70. The shoulders 81 and 83 disengage from the collar 34 and the first handle 18 may be pulled away from the first support 24, thereby freeing the first handle 18. The second and third handles 20 and 22 are disassembled from the first support 24 in the same manner. The first, second and third handles 18, 20 and 22 are disassembled from the second support 26 in the same manner as described above.

The apparatus described herein has three sides and is presented by way of preferred example only. Other apparatuses having two or more sides, which support one or more handles at different distances from a surface, depending on the orientation of the apparatus, could be devised.

What is claimed is:

1. An exercising apparatus for use on a surface, the apparatus comprising:
   (a) a first handle having respective first and second end portions;
   (b) a second handle having respective first and second end portions;
   (c) a third handle having respective first and second end portions;
   (d) a first support having:
      (i) a first, a second and a third side;
      (ii) first means for supporting said first end portion of said first handle at a first permanent distance from said first side;
      (iii) second means for supporting said first end portion of said second handle at a second different permanent distance from said second side;
      (iv) third means for supporting said first end portion of said third handle at a third different permanent distance from said third side;
   (e) a second support having first, second and third sides generally similar to the first, second and third sides respectively of the first support;
      (i) first, second and third means for supporting said second end portions of said first, second and third handles respectively at said first, second and third permanent distances respectively from said first, second and third sides respectively; whereby
   said first and second supports may be oriented to place said respective first sides thereof on said surface, thereby positioning said first handle at said first permanent distance from said surface, or, said first and second supports may be oriented to place said respective second sides thereof on said surface thereby positioning said second handle at said second permanent distance from said second surface, or, said first and second supports may be oriented to place said respective third sides thereof on said surface thereby positioning said third handle at said third permanent distance from said surface.

2. An apparatus as claimed in claim 1 in which said first and second means each include:
   (a) first, second and third holding means for holding said end portions of said first, second and third handles respectively;

(b) first brace means for bracing said first holding means at said first distance from said first sides;
(c) second brace means for bracing said second holding means at said second distance from said second sides;
(d) third brace means for bracing said third holding means at said third distance from said third sides.

3. An apparatus as claimed in claim 2 wherein:
(a) said first holding means include first means for preventing rotation of said first handle;
(b) said second holding means include second means for preventing rotation of said second handle;
(c) said third holding means include third means for preventing rotation of said third handle.

4. An apparatus as claimed in claim 2 wherein said first, second, and third brace means include:
(a) a plurality of stiffening members extending from the sides of each respective support to each respective holding means, and between the respective holding means;
(b) a web member extending between at least two of said stiffening members.

5. An apparatus as claimed in claim 1 in which:
(a) said first, second and third means for supporting include first, second, and third collars respectively, said first, second and third collars having an opening for receiving said first and second end portions respectively, said first, second and third collars having first and second keying members respectively extending radially inwardly:
(b) said first and second end portions of said first, second and third handles having a longitudinal groove forming a first keyway for engagement with said first and second keying members to prevent rotation of said first, second and third handles.

6. An apparatus as claimed in claim 1 wherein:
(a) said first, second and third means for supporting include first, second and third collars respectively having an opening for receiving said first and second end portions of said first, second and third handles respectively;
(b) said first, second and third handles each include:
(i) first and second locking tabs attached by first and second resilient portions respectively to said first and to said second end portions;
(ii) first and second cam portions located adjacent ends of said first and second locking tabs respectively and having first and second tapered surfaces adapted for contact with one of said collars when said first end portion of said second end portion is inserted therein to deflect said locking tabs inwardly;
(iii) first and second depth stops provided adjacent said first and second end portions operable to position said first and second supports at said first and second end portions of said handle respectively;
whereby, said first and second supports are prevented from axial movement at said first and second end portions of said handles.

7. An apparatus as claimed in claim 5 wherein said handles include means for preventing slippage by a hand gripped thereon, wherein said means for preventing slippage includes a plurality of longitudinal grooves extending along said handles.

8. An exercising apparatus for use on a surface, the apparatus comprising:
(a) a first handle having first and second end portions;

(b) a first support having:
(i) a first side located at a first distance from said first end portion of said handle;
(ii) a second side located at a second distance from said first end portion of said handle, said second distance being different from said first distance;
(iii) first means for supporting said first end portion of said handle, the first means including first holding means for holding said first end portion of said first handle, the first means further including first brace means for bracing said first holding means at said first distance from said first side and for bracing said first holding means at said second distance from said second side, the brace means including a plurality of stiffening members and a web member, the stiffening members extending from the sides of the first support to the holding means, the web member extending between at least two of said stiffening members;
(c) a second support spaced apart from said first support, the second support having a respective first side located at said first distance from said second end portion of said handle;
(i) a second side located at said second distance from said second end portion of said handle;
(ii) respective first means for supporting said second end portion of said handle, the respective first means including respective first holding means for holding said second end portion of said first handle, the second means further including respective first brace means for bracing said respective first holding means at said first distance from said respective first side and for bracing said second holding means at said second distance from said respective second side, the respective brace means including a respective plurality of stiffening members and a respective web member, the respective stiffening members extending from the sides of the second support to the respective holding means, the respective web member extending between at least two of said respective stiffening members, whereby said first and second supports may be oriented to place respective first sides on said surface thereby positioning said handle at said first distance from said surface, or said first and second supports may be oriented to place respective second sides on said surface thereby positioning said handle at said second distance from said surface.

9. An exercising apparatus for use on a surface, the apparatus comprising:
(a) a first handle having first and second end portions, the first end portion including a keyway;
(b) a first support having first means for supporting said first end portion of said handle, said first means for supporting including a first collar having an opening for receiving said first end portion of said first handle and a first keying member extending inward of said collar for engagement with said keyway on said first end portion of said first handle, the first support further including a first side and a second side, the first side being located at a first distance from said first end portion of said handle, the second side being located at a second distance from said first end portion of said handle, said second distance being different from said first distance;

(c) a second support spaced apart from said first support the second support having respective first means for supporting said second end portion of said handle, the second support further including a respective first and a respective second sides, the respective first side being located at said first distance from said second end portion of said handle, the respective second side being located at said second distance from said second end portion of said handle; whereby the first and second supports may be oriented to place the first side and the respective first side on said surface thereby positioning said handle at said first distance from said surface or said first and second supports may be oriented to place the second side and respective second side on said surface thereby positioning said handle at said second distance from said surface, and wherein rotation of said first handle is prevented by the engagement of said keyway on said first end portion with said key member on said first collar.

10. An exercising apparatus for use on a surface, the apparatus comprising:
 (a) a first handle having respective first and second end portions;
 (b) a second handle having respective first and second end portions;
 (c) a third handle having respective first and second end portions;
 (d) a first support having:
  (i) a first, a second and a third side;
  (ii) first means for supporting said first end portion of said first handle at a first distance from said first side, the first means for supporting including first means for holding said first end portion of said first handle, the first means for supporting further including first brace means for bracing said first holding means at said first distance from said first side, the first brace means including a plurality of stiffening members extending from a side of the first support to the first holding means;
  (iii) second means for supporting said first end portion of said second handle at a second, different distance from said second side, the second means for supporting including second holding means for holding said first end portion of said second handle, the second means for supporting further including second brace means for bracing said holding means at said second distance from said second side, the second brace means including a plurality of stiffening members extending from a side of the first support to the second holding means;
  (iv) third means for supporting said first end portion of said third handle at a third different distance from said third side, the third means for supporting including third means for holding said end portion of said handle, the third mean for supporting further including third brace means for bracing said third holding means at said third distance from said third side, the third brace means including a plurality of stiffening members extending from a side of the first support to the third holding means;
 (e) a second support having:
  (i) first, second and third sides generally similar to the first, second and third sides respectively of the first support;
  (ii) respective first means for supporting said second end portion of said first handle at the first distance from said similar first side, the respective first means for supporting including respective first holding means for holding the second end portion of said first handle, the respective first supporting means including respective first brace means for bracing said respective first holding means at the first distance from said respective first side, the respective first brace means including a plurality of respective stiffening members extending from a side of the second support to the respective first holding means;
  (iii) respective second means for supporting said second end portion of said second handle at the second distance from said similar second side, the respective second means for supporting including second holding means for holding the second end portion of the second handle, the respective second supporting means further including respective second brace means for bracing said respective second holding means at the second distance from the respective second side, the respective second brace means including a plurality of respective stiffening members extending from a side of the second support to the second respective holding means;
  (iv) respective third means for supporting said second end portion of said third handle at the third different distance from said similar third side, the respective third means for supporting including respective third holding means for holding the second end portion of the third handle, the respective third means for supporting further including respective third brace means for bracing said respective third holding means at the third distance from the respective third side, the respective third brace means including a plurality of stiffening members extending from a side of the second support to the respective third holding means;
 whereby said first and second supports may be oriented to place respective first sides thereof on said surface, thereby positioning said first handle at said first distance from said surface, or,
 said first and second supports may be oriented to place said respective second sides thereof on said surface thereby positioning said second handle at said second distance from said surface or,
 said first and second supports may be oriented to place said respective third sides thereof on said surface thereby positioning said third handle at said third distance from said surface.

11. An apparatus as claimed in claim 9 wherein said first handle has a longitudinal groove extending along said first handle to form said keyway.

12. An apparatus as claimed in claim 9 wherein said first handle includes means for preventing slippage by a hand gripped thereon.

13. An apparatus as claimed in 12 wherein said means for preventing slippage includes a plurality of longitudinal grooves extending along said first handle.

14. An exercising apparatus for use on a surface, the apparatus comprising:
 (a) a first handle having first and second end portions;

(b) a first support having:
  (i) first means for supporting said first end portion of said handle, said first means including a first collar having an opening for receiving said first end portion of said first handle;
  (ii) a first side located at a first permanent distance from said first end portion of said handle;
  (iii) a second side located at a second permanent distance from said first end portion of said handle, said second distance being different from said first distance;
(c) a first locking tab attached by a resilient portion to said first end portion of said first handle;
(d) a first cam portion adjacent an end of said locking tab having a tapered surface adapted to contact said first collar when said first end portion is inserted therein to deflect said locking tab inwardly;
(e) a first depth stop adjacent said first end portion of said first handle operable to position said first support relative to said first end portion of said first handle to lock said first support against axial movement at said first end portion of said first handle;
(f) a second support spaced apart from said first support, the second support having:
  (i) respective first means for supporting said second end portion of said handle;
  (ii) a respective first side located at said first permanent distance from said second end portion of said handle;
  (iii) a respective second side located at said second permanent distance from said second end portion of said handle;
whereby said first and second supports may be oriented to place respective first sides on said surface thereby positioning said handle at said first permanent distance from said surface, or said first and second supports may be oriented to place respective second sides on said surface thereby positioning said handle at said second permanent distance from said surface.

* * * * *